June 19, 1928. H. H. BARBER

DIGGING MEMBER FOR DITCHING MACHINES

Re. 16,997

Original Filed May 14, 1924 2 Sheets-Sheet 1

Witness
H. F. McKnight.

Inventor.
Harry H. Barber.
by Burton & Burton
his Attorneys.

June 19, 1928. H. H. BARBER

DIGGING MEMBER FOR DITCHING MACHINES

Re. 16,997

Original Filed May 14, 1924 2 Sheets-Sheet 2

Witness.
N. Cromwright

Inventor.
Harry H. Barber.
by Burton & Burton
his Attorneys.

Reissued June 19, 1928. Re. 16,997

UNITED STATES PATENT OFFICE.

HARRY H. BARBER, OF AURORA, ILLINOIS, ASSIGNOR TO BARBER-GREENE COMPANY, OF AURORA, ILLINOIS, A CORPORATION OF ILLINOIS.

DIGGING MEMBER FOR DITCHING MACHINES.

Original No. 1,623,957, dated April 12, 1927, Serial No. 713,242, filed May 14, 1924. Application for reissue filed December 29, 1927. Serial No. 243,459.

This invention relates to a digging member for ditching machines and the like, and consists of an endless digging chain composed of a series of digging buckets designed for a milling action with intermediate cleaner links pivotally connecting the buckets. The buckets and cleaner links in their assembled or pivoted relation constitute links of the digging chain, and the under side of the cleaner links are so constructed as to provide proper traction means between the buckets.

While the endless digger is susceptible of digging at an inclination, it is primarily designed for digging in a substantially vertical plane; that is, it is designed to be mounted upon a boom which has a vertical operating position. It is impractical to use digging buckets that act as scoops and take large bites in vertical digging, since the digging chain is maintained closely at its work and cannot flex rearwardly as in digging upon an incline. Consequently, in vertical digging, the endless digger, to be practicable, should be so constructed as to produce a form of milling action. For this purpose, the digging buckets should be comparatively closely spaced and they should be designed to make only a shallow or limited cut so that the operation of the endless digger will resemble the operation of a saw in which each tooth takes its bite throughout the length of the material being sawed and carries the dust along, so each digging element takes its bite which it must maintain from the bottom to the top of the ditch. Of course, the soil is usually soft and the digging elements take a much deeper bite than the saw.

The invention consists in the novel structure and combination of parts hereinafter described and more particularly pointed out and defined in the appended claims.

In the accompanying drawings, which illustrate one form of the invention and in which similar reference numerals refer to similar features in the different views.

Figures 1, 5:
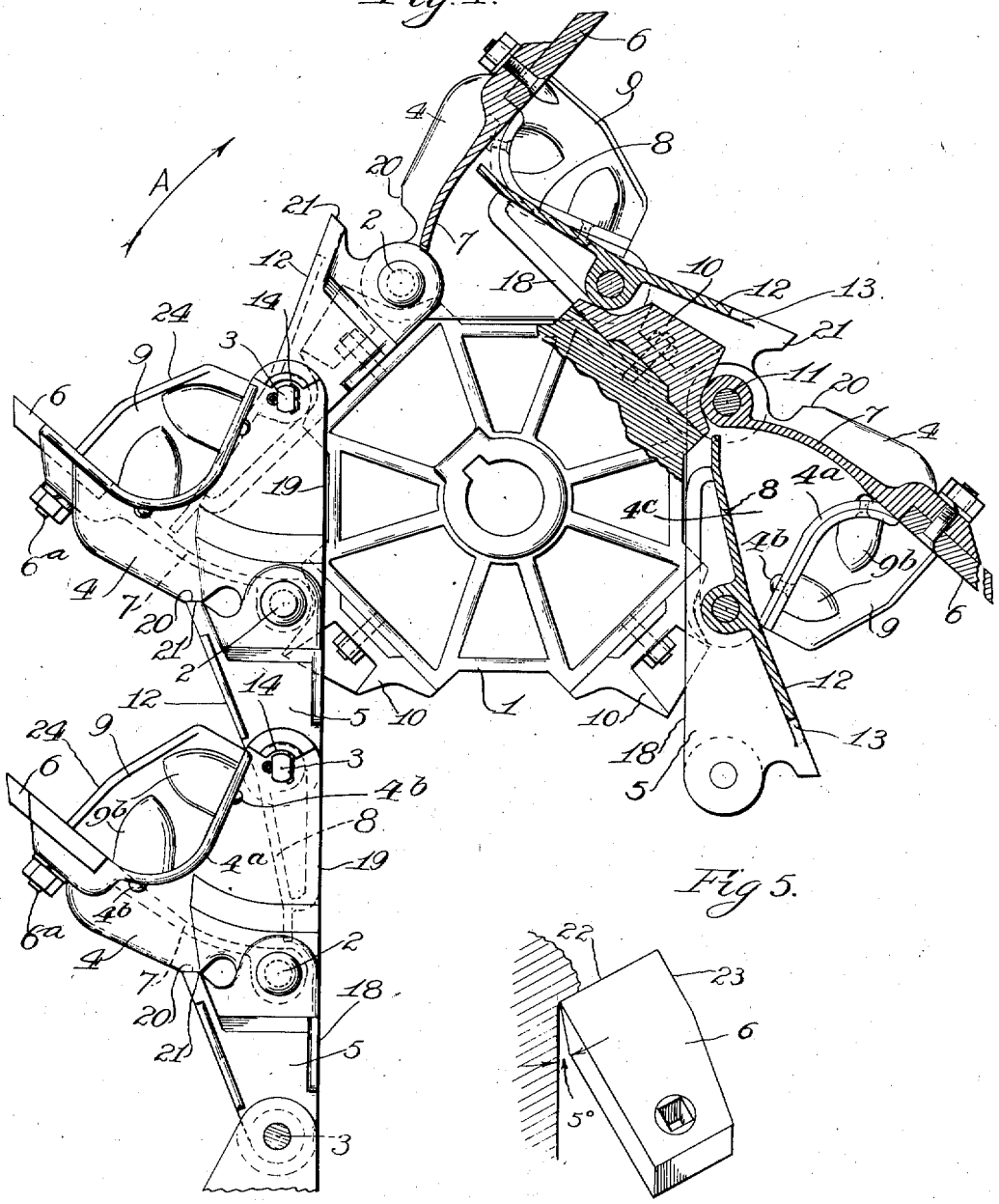
Figure 1 is a side elevation partly in section showing a few links of a digging chain embodying this invention associated with a head wheel over which the chain runs.
Figure 5 is a perspective view of one of the digging elements showing diagrammatically its relation to the soil in a working position.

In Figure 1 of the drawing, there is shown a driven member in the form of a sprocket wheel 1 by which the digging chain is both supported and driven. The endless digging chain consists of a series of digging buckets 4 having bottom walls, the inner surface of which consists of a web 7 of slightly arcuate form. These buckets also have side walls $4^c$. The bottom wall of each bucket has a plurality of digging teeth 6 of chisel form attached by bolts $6^a$ which render the teeth individually removable. The teeth on the different buckets are in staggered relation so as to cover the entire width of the trench while distributing the working strain and insuring a better digging action.

If desirable, the side wall of the bucket may be extended by supplemental pieces 9 bolted to curved seats $4^a$ formed upon the upper edge of the side walls by means of bolts $4^b$. Hoods $9^b$, which open at the inner side of the walls 9, may protect the bolts $4^b$.

Between adjacent buckets 4, there is pivoted a cleaner link 5. The cleaner link 5 is pivoted between the side walls $4^c$ of a bucket by means of a pivot 3, and this cleaner link has a portion 8 that extends rearwardly between said side walls to a point closely adjacent the bottom surface of the bucket and forms a movable back therefor. This cleaner plate swings upon the axis of the pivot 3 for discharging the load from the bucket as it passes over the head sprocket. For this reason the bottom 7 of the bucket is struck upon a curve with the axis of pivot 3 as a center, so that the lower edge of the cleaner link can closely follow the contour of the bottom in its discharging movements. The cleaner link has a portion 12 co-planar with the part 8 that extends forwardly of the pivot 3 and serves as a discharge platform or chute over which the material is discharged. This part 12 is provided with an opening 13 for the exit of impacted material between the chain and head sprocket. It will be noted that the discharge platform has depending parts upon its sides forming a socket or space therebeneath which constitutes a traction means whereby the chain may be propelled, as will later more fully appear. These depending parts are bolted or pivoted to the forward bucket by a pivot bolt 2.

The head sprocket 1 is preferably of polygonal form and provides smooth flat surfaces for seating the buckets as they traverse the same. Alternate flat faces are provided with traction means in the form of teeth 10 which are adapted for co-operating with the traction means on the cleaner links. In other words, the teeth 10 are designed for entering the sockets beneath the discharge platform 12. It will be noted that the socket is located between the pivots 2 and 3 of the cleaner link. The pivot bolt 2 extends through a cylindrical bearing 11 on the lower body portion of the bucket and the teeth 10 engage this cylindrical bearing 11 for driving the chain. In connection with the foregoing, it will be observed that the openings 13 in the cleaner link communicate with the above-mentioned socket, so that any impacted material between the wheel and chain may escape therethrough.

The aforementioned pivot bolts 2 and 3 may be retained by cotter pins as indicated in connection with the pivot 3, (Figure 1) and to protect the cotter pins, hoods 14 may be formed upon the bucket 4.

Figure 3:
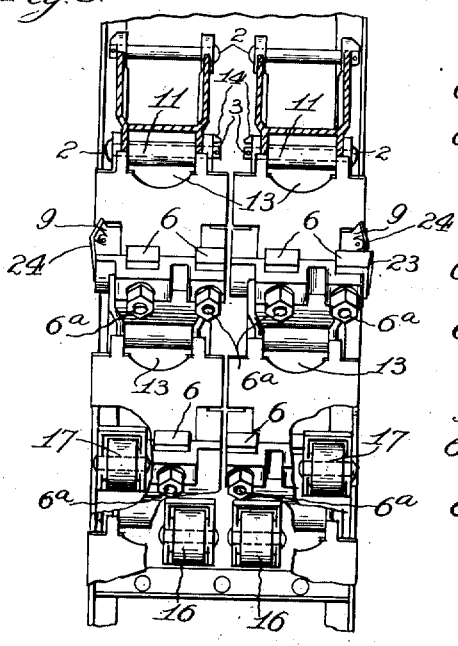
Figure 3 is a front elevational view, partly in section, of the mechanism shown in Figure 2, illustrating a construction in which two chains may be used side by side.
Figure 2:
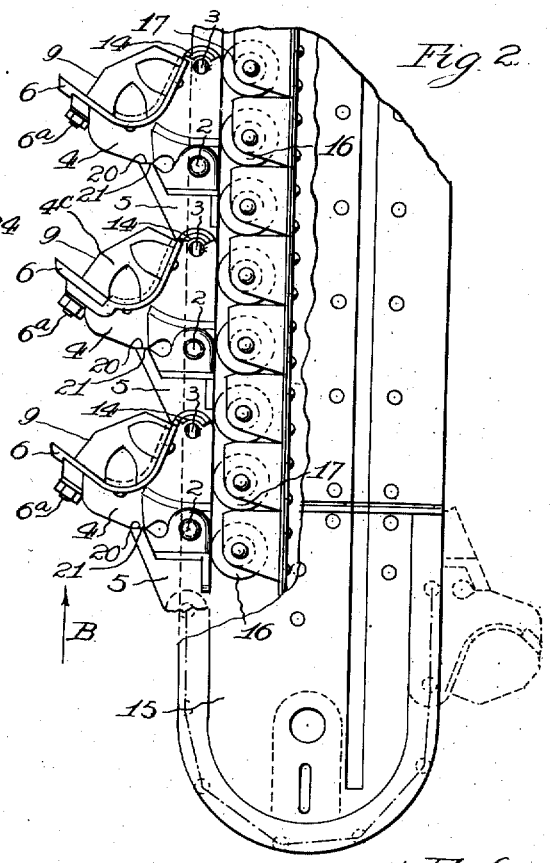
Figure 2 is a side elevational view on a smaller scale showing the lower end portion of a boom and a part of the digging chain.

In Figure 2, there is shown the lower end of a fabricated steel boom 15 which is vertically disposed so that the digging buckets will move vertically. The guide pulley for the chains is removed and a part of the side wall of the boom is broken away to reveal the rollers 16 and 17 over which the chain links track as they travel upward at the working ply of the chain. The bottom edges of the buckets and cleaner links that contact with the rollers are in the form of straight ribs 18 and 19 that lie in a common vertical plane when the buckets and cleaner links are straightened out for vertical travel along the boom. It will be noted that the rollers 16 and 17 are only wide enough to support one rib, so that each rib travels over a separate roller. But to insure lateral stability of the links, the rollers 16 are positioned to register with one rib of each pair and the next succeeding rollers 17 are laterally offset from the rollers 16 so as to register with the other ribs. Thus at any particular position, the link section is supported at opposite corners by one roller 16 and one roller 17. The structure in Figures 2 and 3 show two endless diggers side by side which may be desirable under certain conditions.

For further stabilizing the chain, the pivoted connections 2 are prevented from folding backward toward or between the supporting rollers 16 and 17 by the provision of co-acting shoulders or abutments 20 and 21 respectively formed on the bottom wall of the bucket and the forward end of the cleaner link. These shoulders are normally in abutting relation when the buckets and the cleaner links are in alignment, and as these parts are in alignment when the buckets ascend in their digging operation, it will be appreciated that the buckets will always be maintained at their work.

I have found that certain proportions in the design of the digging teeth 6 will render them practically self-sharpening in most soil and have illustrated such proportions in the drawings. Each tooth is supported upon the casting 4, through about two-thirds of its length. Its cutting edge, indicated at 22 in Figure 5, is sharpened at an angle of about 45° but the tooth is supported in the casting 4 at an angle of 40° from the horizontal, leaving a clearance angle of about 5° between the direction of working travel and the beveled end of the tooth. I have found that upon making the tooth considerably thicker than this the frictional wear upon this beveled end is not sufficient to maintain a sharp cutting edge at 22, while if the tooth is more sharply beveled or made thinner its cutting edge lacks the necessary stability; but with the proportions shown the frictional wear on the beveled end of the tooth is found to be just about sufficient to maintain a fairly sharp edge without repeated regrinding.

The particular tooth shown in Figure 5 is one of the outside teeth of the chain having a lateral cutting edge 23, which extends slightly beyond any part of the supporting bucket casting 4 to insure cleaning up the side walls of the trench as it is formed while avoiding any undue friction between the side walls and the non-cutting portion of the bucket. As indicated in Figure 1, the side walls 9 of the buckets are also formed with sharpened upper edges 24 which act to some extent as the cutters for smoothing up the sides of the trench. These ends or sides 9 of the buckets are preferably made of the same grade of manganese steel as that used for the teeth 6. The digging teeth 6 and the applied side walls 9 thus take most of the wear which occurs in the use of the machine and may be readily replaced at will.

Figure 4:
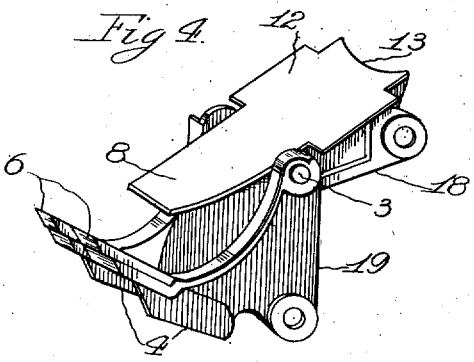
Figure 4 is a perspective view of a digging bucket illustrating the cleaner plate.
Figure 6:
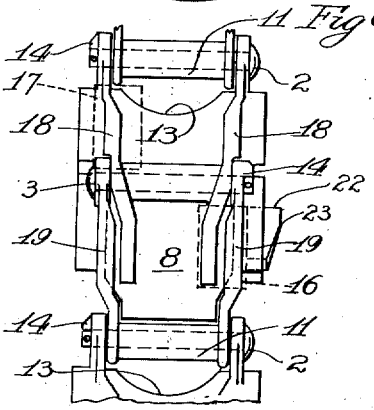
Figure 6 is a fragmentary rear elevational view of the chain.

In the perspective detail view of Figure 4, the walls 9 are omitted to reveal the construction of the sweep-out lip 8 more clearly and the folding of the link about its hinge pivot 3 is considerably exaggerated as compared with the actual angular movement which takes place as the link traverses the head sprocket 1, as shown in Figure 1. It may be noted, however, that the distance upward from the pivot 3 to the adjacent coupling pivot 2 is considerably less than the distance downward from the same hinge pivot 3 to the lower coupling pivot 2. This makes the sweep-out arm 8 somewhat longer than it would be if the hinge 3 were placed exactly midway of the coupling pivots 2, and increases the sweep-out stroke for a given angle of folding of the link.

In connection with the foregoing, it should be particularly observed that the endless chain is not a built-up affair as is common in the prior art, but that the digging buckets and cleaner links form actual links in the chain. In other words, the buckets themselves constitute an integral part of the chain. It should be further observed that the coacting shoulders 20 and 21 will maintain the chain from buckling between the rollers on the boom, with the result that the digging ply of the chain will always be maintained at its work. It should also be noted that the short and narrow digging elements 6 on the buckets are not designed for a scraping action, but on the other hand, produce a milling action.

While it may be old to connect a series of conveyor buckets together, I am not aware of any endless digging chain in which the buckets constitute an integral part of the chain and are connected together by cleaner links which provide the traction means in passing over a driven member or sprocket wheel.

I am aware that many changes may be made, and numerous details of construction may be varied through a wide range without departing from the principles of this invention, and I, therefore, do not purpose limiting the patent granted hereon, otherwise than necessitated by the prior art.

I claim as my invention:

1. In a ditching machine, an endless digging chain consisting of a series of digging buckets, each having a bottom wall and side walls, a cleaner link pivotally connected to the side walls of each bucket, and to the body portion of the next forward bucket in combination with a sprocket wheel having smooth portions over which said buckets pass and intermediate traction portions adapted for engaging the under side of the cleaner links between the pivots thereof.

2. In a ditching machine, an endless digging chain consisting of a series of digging buckets, each having a bottom wall and side walls, a cleaner link pivotally connected between the side walls of each bucket to provide a back wall therefor, and each cleaner link being pivotally connected to the body portion of the next forward bucket, in combination with a sprocket wheel having smooth portions over which said buckets pass, and intermediate traction portions for engaging the under side of said cleaner links between the pivots thereof, each cleaner link having an aperture for the escape of impacted material between said sprocket wheel and chain.

3. An endless digging chain consisting of a series of digging buckets, each having a bottom wall and side walls, and a cleaner link between adjacent buckets, each cleaner link extending between the side walls of a bucket toward the bottom thereof to form the back wall thereof, a pivot for directly connecting each cleaner link to the side walls of each bucket and a second pivot spaced from the first pivot connecting said cleaner link to the body portion of the next forward bucket, said cleaner links and buckets constituting links in the endless chain.

4. An endless digging chain consisting of a series of digging buckets, each bucket having a bottom wall and side walls, a cleaner link between adjacent buckets and extending between the side walls of one bucket to form the back thereof, a pivot for connecting the cleaner link to the said side walls, and a second pivot spaced from the first pivot for connecting said link to the body portion of the next forward bucket, said cleaner link having an opening adjacent said second pivot for the escape of impacted material.

5. An endless digging chain consisting of a series of digging buckets and intermediate cleaner links having pivotal connection with adjacent buckets, each cleaner link having a rearwardly extending portion forming the back wall of the rear bucket, said buckets constituting links in the digging chain and each cleaner link having provision for receiving an impelling driving means.

6. An endless digging chain consisting of a series of digging buckets, and cleaner links pivotally connecting adjacent buckets, said buckets and cleaner links constituting links in the chain, each cleaner link having a space between its pivots for receiving an impelling driving means.

7. In a ditching machine, an endless digging chain consisting of a series of digging buckets and intermediate links having means forming movable backs for said buckets, said buckets and intermediate links being directly pivotally connected and constituting links in the digging chain, in combination with a sprocket wheel having smooth portions over which said buckets pass, and intermediate teeth adapted for engaging the pivotal connection of each intermediate link with its forward bucket.

8. In a ditching machine, an endless digging chain consisting of a series of digging buckets and intermediate cleaner links having means forming movable backs for said buckets, said intermediate links being directly pivotally connected to adjacent buckets and said links and buckets constituting links in the digging chain, in combination with a driven member having smooth portions over which said buckets pass and intermediate teeth for engaging the pivotal connections of the cleaner links with the forward bucket, each cleaner link having an opening for the exit of impacted material between said driven member and chain.

9. In a ditching machine, an endless digging chain comprising a series of digging buckets, and cleaner links pivotally connecting adjacent buckets; said links and buckets constituting links in the endless chain; and each cleaner link being so constructed as to provide a space rearwardly of its pivotal connection with its forward bucket for receiving an impelling means.

10. In a ditching machine, an endless digging chain consisting of a series of buckets and intermediate cleaner links pivotally connecting adjacent buckets; said links and buckets constituting links in the digging chain and each cleaner link forming a traction receiving means whereby said chain may be propelled.

11. An endless digging chain consisting of a series of digging buckets, and intermediate cleaner links pivotally connecting adjacent buckets and forming movable back walls for said buckets, said buckets and cleaner links constituting links in the chain and each bucket and an adjacent cleaner link having co-acting shoulders to prevent flexing of the parts in one direction, the shoulder on the cleaner link being formed upon the forward end thereof.

12. In a ditching machine, an endless digging chain comprising a series of buckets, each bucket having a bottom wall and side walls, a swingable back between the side walls, pivot means directly connecting the back and side walls, said swingable back extending forward of the axis of said pivot to provide a dumping platform.

13. An endless digging chain consisting of a series of digging buckets and intermediate cleaner links pivotally connecting adjacent buckets, each bucket having a bottom wall and side walls and each cleaner link having a direct pivotal connection with the side walls of a bucket and having a tail portion extending between such side walls to form the back of the bucket, each cleaner link having also a direct pivotal connection with the body portion of the next forward bucket, whereby said buckets and links soley constitute the digging chain and each cleaner link being constructed to provide entrance for a driven member whereby said chain may be rotated.

14. An endless digging chain consisting of a series of buckets and intermediate cleaner links, each bucket having a bottom wall and side walls, and each cleaner link having a direct pivotal connection with the side walls of a bucket and extending rearwardly therebetween to form a movable back for such bucket, each cleaner link having also a forwardly extending platform with depending parts pivotally connected to a wall of the next forward bucket, the space between said parts being adapted for receiving a driving means.

15. In an endless digging chain, a digging bucket comprising a bottom wall provided with digging elements and side walls, a cleaner link, a direct pivotal connection between said link and said side walls, and said cleaner link having a portion extending rearwardly between said side walls to provide a movable back for said bucket, said cleaner link embodying bearings for pivotal attachment to the next forward bucket and being constructed rearwardly of said bearing for receiving a driving member.

16. In a ditching machine, a digging belt, comprising bucket members and cleaner links pivotally connected together, each cleaner link having a web which extends in the direction of travel of the chain, and transversely of which the bucket members extend, and a sprocket wheel for supporting and driving the chain having teeth which engage pivotal connections between said buckets and links, and the web of each chain link having an opening adjacent its pivotal connection to release impacted material adjacent the teeth of said sprocket.

17. In a ditching machine, an endless digging chain composed of digging buckets and cleaner links pivotally coupled, means for mounting said chain for traveling in a substantially vertical direction including a boom, rollers upon the working side of said boom, and spaced apart so that a bucket and an adjacent cleaner link are always supported by a pair of rollers, said buckets and cleaner links having coacting shoulders for preventing flexing of the chain between said rollers.

18. In a ditching machine, an endless digging chain comprising digging buckets and cleaner links pivotally connected together, and solely constituting the chain, said buckets and links having coactive shoulders for preventing reverse flexing of said chain, and a boom for maintaining the working ply of said chain at its work, said boom having rolling element in engagement with said chain and so spaced that a bucket and an adjacent link are always supported upon a pair of rolling elements.

19. In a ditching machine, a chain section comprising two parts hinged together, one part integrally comprising the bottom and side walls of an upwardly and rearwardly open bucket extending from its outer face, the hinge axis being disposed at a distance above the bottom of the bucket and the other part of the chain section including a back wall for the bucket extending above and below said hinge axis and between said side walls to close the rear opening of the bucket, the bottom of the bucket being curved concentrically about the hinged axis to permit the lower edge of the back wall to sweep across said curved bottom when the chain section folds at the hinge as in traversing a pulley, said chain section having coupling pivots at its upper and lower ends for attachment to adjacent chain sections and the hinge of the link being nearer to the upper coupling pivot.

20. In a ditching machine, an endless digging chain composed of bucket members and cleaner links pivotally coupled for folding in passing over a sprocket wheel, said buckets constituting links in the chain, said chain being mounted for travel of its working ply in substantially vertical direction upwardly, each bucket member having digging means extending from its front face and supporting means for the chain including rollers over which the working ply travels, the rear faces of the chain parts have straight portions adapted to track over said rollers and cooperating means on the adjacent parts of connected links limiting the unfolding movement thereof at the position at which said straight portions lie in alinement with each other, the machine including a boom on which said rollers are mounted and the rollers being arranged in staggered relation thereon in transverse rows, the rollers of adjacent rows supporting opposite sides of the chain parts.

21. An endless digging chain consisting of a series of digging buckets, each bucket having a bottom wall and side walls, a cleaner link between adjacent buckets and extending between the side walls of one bucket to form the back thereof, a pivot rod for connecting the cleaner link to the said side walls, and a second pivot rod spaced from the first pivot rod for connecting said link to the body portion of the next forward bucket, in combination with a sprocket wheel over which said digging chain passes, said sprocket wheel having traction portions for engaging said pivot rods for impelling said chain.

22. In a ditching machine, an endless digging chain consisting of a series of digging buckets and intermediate links having means forming movable backs for said buckets, said buckets and intermediate links being directly pivotally connected and constituting links in the digging chain, in combination with a sprocket wheel having traction portions for engaging portions of said digging chain from the under side thereof for impelling the same.

In testimony whereof I have hereunto subscribed my name at Aurora, Kane County, Illinois.

HARRY H. BARBER.